US009171274B2

(12) United States Patent
Desai et al.

(10) Patent No.: US 9,171,274 B2
(45) Date of Patent: Oct. 27, 2015

(54) METHOD AND SYSTEM FOR ENERGY MANAGEMENT

(76) Inventors: Aniruddha Anil Desai, Bundoora (AU); Jugdutt Singh, Bundoora (AU)

( * ) Notice: Subject to any disclaimer, the term of this patent is extended or adjusted under 35 U.S.C. 154(b) by 678 days.

(21) Appl. No.: 13/395,192

(22) PCT Filed: Sep. 9, 2010

(86) PCT No.: PCT/AU2010/001160
§ 371 (c)(1),
(2), (4) Date: May 4, 2012

(87) PCT Pub. No.: WO2011/029137
PCT Pub. Date: Mar. 17, 2011

(65) Prior Publication Data
US 2012/0215369 A1 Aug. 23, 2012

(30) Foreign Application Priority Data

Sep. 9, 2009 (AU) ............................. 2009904370

(51) Int. Cl.
G05D 3/12 (2006.01)
G05B 13/00 (2006.01)
G05B 15/00 (2006.01)
G01R 21/133 (2006.01)
G06F 17/00 (2006.01)
(Continued)

(52) U.S. Cl.
CPC ............... *G06Q 10/06* (2013.01); *G06Q 50/06* (2013.01); *H02J 3/00* (2013.01); *H02J 2003/003* (2013.01); *H02J 2003/007* (2013.01)

(58) Field of Classification Search
CPC ....... H02J 3/14; H02J 13/001; H02J 13/0013; H02J 13/0079; H02J 13/0086; H02J 2003/003; Y04S 10/40; Y04S 10/54; Y04S 20/222; Y04S 40/12; Y04S 40/128; G06Q 10/00; G06Q 10/06312; G06Q 50/06; G06F 1/206; G06F 1/3203; G06F 9/505; G06F 9/5083; G06F 9/5094; F24F 11/00; F24F 11/0012; F24F 2011/0046; F24F 2011/0068; Y02B 60/142; Y02B 70/3225; Y02B 90/2607; G05B 13/041; G05B 15/02; G05B 17/02; G05B 2219/2642; G08B 21/0423; G08B 21/0484; G08B 21/182
USPC ................ 700/275–278, 286, 291, 295–300; 705/400, 412, 7.11, 7.12, 7.22; 702/57, 702/60–62; 340/870.01, 870.02, 870.16, 340/870.17, 500, 501, 540, 635, 657
See application file for complete search history.

(56) References Cited

U.S. PATENT DOCUMENTS 4,916,909 A * 4/1990 Mathur et al. .................... 62/59
4,990,893 A * 2/1991 Kiluk ......................... 340/573.1
(Continued)

OTHER PUBLICATIONS

International Search Report issued on May 20, 2011, in corresponding International Patent Application No. PCT/AU2010/001160.

*Primary Examiner* — Crystal J Barnes-Bullock
(74) *Attorney, Agent, or Firm* — AKC Patents, LLC; Aliki K. Collins

(57) ABSTRACT

A method (300) of managing energy consumption associated with premises includes firstly generating (302) and storing an initial energy profile (304) of the premises. The profile (304) includes information characterizing the premises, such as occupancy patterns, function of the premises, geographical location, installed appliances (108), and so forth. An expected energy usage (308) associated with the premises is computed over a predetermined time period based upon the information in the initial energy profile (304). Actual energy usage (312) associated with the premises is then recorded over the predetermined time period and the energy profile (304) is adaptively updated based upon the recorded energy usage (312). The energy profile (304) and the actual energy usage (312) are used to manage energy consumption associated with the premises. An installable system (100) and apparatus (102) for implementing the method at premises are also provided.

20 Claims, 7 Drawing Sheets

(51) Int. Cl.
*G06Q 10/00* (2012.01)
*G01R 21/00* (2006.01)
*G08B 21/00* (2006.01)
*G06Q 10/06* (2012.01)
*G06Q 50/06* (2012.01)
*H02J 3/00* (2006.01)

(56) References Cited

U.S. PATENT DOCUMENTS

| 6,577,962 | B1 | 6/2003 | Afshari | |
| 7,062,389 | B2 * | 6/2006 | Johnson et al. | 702/61 |
| 7,206,670 | B2 * | 4/2007 | Pimputkar et al. | 700/291 |
| 7,644,148 | B2 * | 1/2010 | Ranganathan et al. | 709/223 |
| 7,894,943 | B2 * | 2/2011 | Sloup et al. | 700/276 |
| 8,037,329 | B2 * | 10/2011 | Leech et al. | 713/320 |
| 8,600,562 | B2 * | 12/2013 | Oswald | 700/278 |
| 2003/0055676 | A1 * | 3/2003 | Huneycutt | 705/1 |
| 2003/0055677 | A1 * | 3/2003 | Brown et al. | 705/1 |
| 2003/0101009 | A1 | 5/2003 | Seem | |
| 2007/0239317 | A1 | 10/2007 | Bogolea et al. | |
| 2008/0082183 | A1 | 4/2008 | Judge | |
| 2010/0217651 | A1 * | 8/2010 | Crabtree et al. | 705/10 |

* cited by examiner

METHOD AND SYSTEM FOR ENERGY MANAGEMENT

FIELD OF THE INVENTION

The present invention relates generally to management of energy usage. More particularly, the invention is concerned with a method, system and apparatus for managing energy consumption associated with particular premises, preferred embodiments of which empower energy users to take greater control of their energy consumption.

BACKGROUND OF THE INVENTION

Many scientists, environmental agencies, governments, corporations and individuals are increasingly concerned about the costs and/or environmental impact of energy generation and consumption. Increasing energy consumption in homes and offices is a major contributor to carbon emission. In addition to increases in average consumption, peak energy consumption in domestic and industrial environments is growing even more rapidly. This is a particular additional concern, since meeting peak energy demands will require the upgrade of existing power generation facilities and/or the construction of new power plants if severe consequences are to be avoided, such as power outages or load shedding.

As such, the increasing cost of energy production and consumption, and its impact on greenhouse gas emission and climate change, are considered to be amongst the most urgent challenges facing the global community. Approaches to reducing carbon emissions, such as the use of low emission generation technologies, including wind, solar, tidal and so forth, as well as other carbon reduction technologies, such as carbon capture, will require many years of development, and substantial investment, before they are able to provide significant reductions in emissions. Even then, in the face of increasing population growth and ongoing advances in developing countries, improvements in efficiency of energy usage and reductions in individual energy consumption will be essential to creating sustainable energy markets.

Accordingly, there has been a significant push from many governments and environmental agencies to reduce both the average and peak power consumption within homes and offices. However, this is difficult to achieve in the absence of detailed energy consumption metrics. For example, most home owners and office administrators have no tools or facilities which would enable them to determine where and when energy is being consumed. Furthermore, even if the source of consumption is known, it may not be apparent how that consumption can be reduced. Therefore, while promotions to encourage users to reduce consumption have started creating more widespread awareness of the issue, the ability of typical consumers to respond to these promotions is generally limited.

At the same time, there is an increasing deployment around the world of more advanced metering systems, such as "interval" or "time-of-use" meters, and more sophisticated "smart meters". Whereas conventional meters simply record total consumption, without maintaining any records of time of use, these more advanced meters are able to identify and record energy consumption in greater detail, for example on an hourly, or even more frequent, basis. Smart meters differ from older interval meters in that the former generally also include at least automated meter reading functions as well as other features such as real-time monitoring, power outage notification, and/or power quality monitoring. Automated meter reading, in particular, requires meters to include appropriate communications technology, which may be based on RF (wireless) transmission, power line communications protocols, and/or other networking technologies, which enable the meters to transmit usage data back to the power supplier for monitoring and billing purposes.

Amongst other benefits, smart metering technology enables the implementation of time- and/or demand-dependent tariffs, which provide users with an incentive not only to reduce their average consumption, but also to avoid consumption at peak times, where possible, which assists in reducing the overall peaks in domestic and industrial energy consumption. However, the full benefit of such technologies can only be achieved if users are equipped with the necessary information regarding their energy usage, and empowered to act effectively on the basis of that information.

Accordingly, while the technological infrastructure enabling consumers to improve their behaviour is becoming available, there remains a need to provide users with effective tools and facilities for reviewing and acting upon the available information in an effective manner. In order for a solution to be practically deployed in a large proportion of domestic and industrial premises, it must be of relatively low cost. Furthermore, an effective solution must be easy for end-users to understand and operate, and should be capable of providing significant benefits when used with existing (ie legacy) appliances without requiring significant upgrades to existing wiring. The present invention seeks to address these needs.

SUMMARY OF THE INVENTION

In one aspect, the present invention provides a method of managing energy consumption associated with a premises, including the steps of:
  generating and storing an initial energy profile of the premises, the profile including information characterising the premises;
  computing an expected energy usage associated with the premises over a predetermined time period based upon the information in the initial energy profile;
  recording actual energy usage associated with the premises over the predetermined time period;
  adaptively updating the energy profile based upon the recorded energy usage; and
  using the energy profile and the actual energy usage to manage energy consumption associated with the premises.

Advantageously, therefore, the invention provides "context-aware" management of energy consumption associated with a particular premises, such as an office, domestic home, or other energy-consuming facility. In particular, each such premises may be characterised by its own unique profile, which can be updated adaptively in response to ongoing actual usage patterns, thereby enabling ongoing monitoring and management of energy consumption that is specific (ie customised) to the premises. Amongst other benefits, this approach enables an automated system to make "intelligent" presentations of information as well as recommendations of practical energy-saving measures. Users (eg home owners and office administrators) are thus empowered to make decisions in relation to their energy consumption without the need to review and interpret large quantities of data relating to the energy consumption associated with the premises.

Information in the energy profile may include a variety of characteristic information relating to the geographic location of the premises, the size, content and nature of use of the premises, and typical times of use of the premises.

For example, the profile may include information relating to daily and/or weekly occupancy patterns, such as the time of day during which the premises is occupied, and the number of occupants. The information may also include the size of the premises, and associated information such as the layout of the premises, number of rooms, and so forth.

The profile may also include information relating to the function of the premises. For example, the profile may identify the premises as a home, an office, a restaurant, or other type of facility. This information may be used to infer a variety of typical characteristics of energy consumption associated with the premises. For example, a home will generally show lower occupancy rates during weekday business hours, and higher occupancy rates, and associated energy consumption, during weekday mornings and evenings, and at weekends. An office, on the other hand, will typically have opposite energy consumption characteristics, with highest consumption occurring during weekday business hours. Restaurants, cafés and so forth will also have associated typical characteristic consumption patterns. Of course, specific individual premises will not necessarily conform to a "typical" or "average" consumption pattern, however embodiments of the invention are able to account for this variation, through the process of adaptive updates to the energy profile based upon actual recorded energy usage over time. It is therefore a particular advantage of the invention that it is able automatically to adapt an initial "template" profile to the specific usage characteristics of a particular premises, in order to generate a unique profile for ongoing customised management of the energy consumption associated with the premises.

The profile may also include information relating to the geographical location of the premises. From a geographical location, associated climate information may be derived, along with relevant short-term meteorological information, such as weather forecasts and live meteorological data. Again, the availability of this information facilitates customised management of energy consumption associated with the premises.

The profile may also include information relating to associated appliances, such as the number, type and characteristics of energy appliances installed at the premises. These may include details of energy-consuming appliances, such as heating and/or cooling appliances, computers, televisions, refrigeration units, cooking facilities (domestic and/or industrial), and so forth. Energy-generating appliances may also be associated with a premises, such as wind and/or solar power generators. While the inclusion of information in relation to installed appliances within the initial energy profile enables a more accurate computation of expected energy usage, it is also possible that the mix of appliances associated with the premises may be inferred based upon other information in the profile, along with actual energy usage, and adaptively incorporated into the energy profile. For example, correlations will exist between the observed energy consumption of heating and cooling appliances, and recorded meteorological data, such as daily maximum and minimum temperatures. Similarly, correlations exist between the use of cooking appliances and time of day, depending upon the function of the premises (eg domestic house, or restaurant). Energy generation, eg of solar panels, is also correlated with daily meteorological observations.

In some embodiments, the method further includes performing real-time monitoring of internal and/or external temperatures of the premises. Advantageously, this enables the setting and/or efficiency of heating and cooling appliances within the premises to be evaluated, thereby providing opportunities to manage ongoing energy consumption associated with such appliances by adjustment to operational settings, such as times of operation and/or set temperatures.

The steps of recording actual energy usage, and adaptively updating the energy profile, may be repeated over one or more subsequent time periods. In particularly preferred embodiments, the rate and/or magnitude of updates are reduced over time as compared with the initial update cycle. As noted above, the initial energy profile may be based upon one or more templates, for example relating to the function and/or geographical location of the premises. Accordingly, initially allowing larger and/or more rapid updates to the profile facilitates adaptation of the templates to actual characteristics of the premises. Subsequently limiting the rate and/or magnitude of further updates serves to prevent uncharacteristic or unusual usage patterns from resulting in undesired adjustments to the profile.

In preferred embodiments, managing energy consumption may include detecting abnormal events, and generating corresponding alerts. Managing energy consumption may also include activating and deactivating appliances, where suitable facilities are available to do so. A step of activating or deactivating an appliance may include requesting confirmation by a human operator, and may involve the manual and/or automated operation of the appliance via a remote interface. Managing energy consumption may further include identifying and/or predicting potential energy-saving strategies, such as a reduction in standby power consumption. The method may also include alerting a human operator if it is detected that one or more appliances may have inadvertently been left on.

More particularly, the step of managing energy consumption may include:
  sending to an operator information regarding energy consumption and/or alerts relating to abnormal events (for example, via email, SMS messaging, messages transmitted to a specific remote software application, and/or other means);
  receiving from the operator an instruction for operation of one or more appliances associated with the premises (eg via email, SMS messaging, messages transmitted using a specific remote software application, or other means); and
  controlling said one or more appliances in accordance with the operator instructions.

In another aspect, the invention provides a system for managing energy consumption associated with a premises, the system including:
  a metering unit which is configured to provide time-dependent readings of energy usage associated with the premises; and
  a microprocessor-based controller including an interface for communicating with the metering unit, and having a data store containing information representing an energy profile of the premises,
  wherein the controller is configured to:
    compute an expected energy usage associated with the premises over a predetermined time period based upon the information in the energy profile;
    receive from the metering units, and record in the data store, actual energy usage associated with the premises over the predetermined time period;
    adaptively update the information representing the energy profile of the premises, based upon the recorded energy usage; and use the information representing the energy profile of the premises, and the actual recorded energy usage, to manage energy consumption associated with the premises.

The system may further include a user interface apparatus having a graphical display and appropriate control inputs enabling an operator to review information representative of energy consumption associated with the premises, and to direct operation of the controller and/or appliances installed at the premises. The user interface apparatus may be, for example, a dedicated touch screen terminal installed at the premises. Alternatively, or additionally, the user interface apparatus may be implemented in the form of a suitable software application executing on a personal computer located at the premises or elsewhere. For a user interface apparatus installed at the premises, the controller and the user interface may optionally be implemented via a common microprocessor platform. Alternatively, the controller may communicate with the user interface apparatus via a suitable communications link, such as a direct serial connection (USB or similar), via a local network connection (eg Ethernet, Wi-Fi, or similar), or via the Internet.

The system may further include additional communications interfaces, such as an SMS or other messaging interface, to enable the delivery of real-time alerts, warnings or updates to a human operator.

Where available, the system may interface to "smart" appliances installed at the premises, which are operable by the controller via one or more appliance communications systems. For example, it may be possible to communicate with some smart appliances via a suitable network connection. In some premises, power line communications may be employed for this purpose.

In yet another aspect, the invention provides a computer-implemented apparatus for managing energy consumption associated with a premises, the apparatus including:
  a microprocessor;
  at least one memory device, operatively coupled to the microprocessor;
  at least one input/output peripheral interface, operatively coupled to the microprocessor and configured to communicate with a metering unit which provides time-dependent reading of energy usage associated with the premises,
  wherein the at least one memory device includes a data store containing information representing an energy profile of the premises, and
  wherein the at least one memory device further contains executable instruction code which, when executed by the microprocessor, implements a method including the steps of:
    computing an expected energy usage associated with the premises over a predetermined time period based upon the information representing the energy profile of the premises;
    receiving from the metering unit, and recording in the data store, actual energy usage associated with the premises over the predetermined time period;
    adaptively updating the information representing the energy profile of the premises based upon the recorded energy usage; and
    using the information representing the energy profile of the premises, and the actual record associated with the premises, to manage energy consumption associated with the premises.

In its various embodiments, therefore, the invention is able to provide a context-aware method, system or apparatus which enables the customised management of energy usage associated with a particular premises. In preferred embodiments the invention interacts with human operators, for example by providing timely and relevant warnings, alerts and energy usage updates, and enables the operator to make immediate and effective decisions having positive effects on energy consumption. The immediacy and specificity of alerts and other messages may be both persuasive and empowering to the human operator. The invention thus ideally enables consumers to take effective control of their appliances and energy consumption in real-time.

Further preferred features and advantages of the invention will be apparent to those skilled in the art from the following description of a preferred embodiment of the invention, which should not be considered to be limiting of the scope of the invention as defined in any of the preceding statements, or in the claims appended hereto.

BRIEF DESCRIPTION OF THE DRAWINGS

A preferred embodiment of the invention is described with reference to the accompanying drawings, in which like reference numerals refer to like features, and wherein.

DETAILED DESCRIPTION OF PREFERRED EMBODIMENTS

Figure 1:
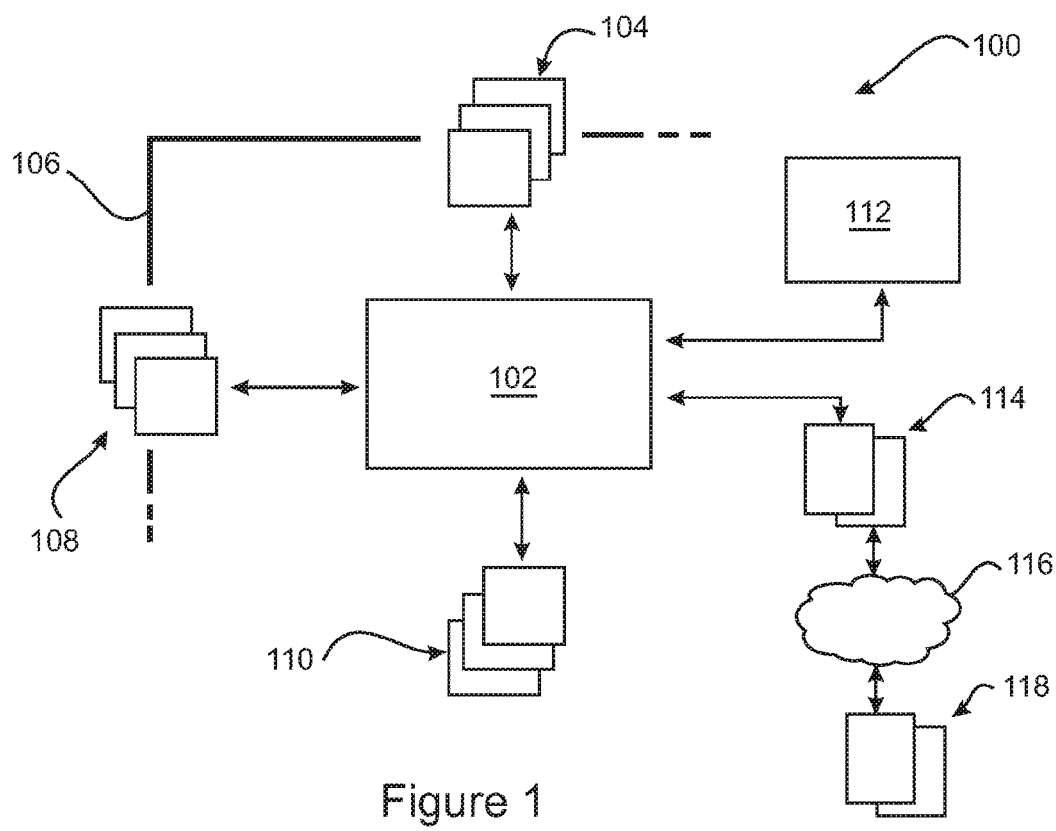
FIG. 1 is a schematic diagram of a system for managing energy consumption associated with a premises, according to an embodiment of the invention.

FIG. 1 illustrates schematically a system 100 embodying the present invention. The system 100 is designed and configured for the management of energy consumption associated with a particular premises, which in the example described herein is a building, such as an office building, including a number of distinct tenants. As such, the system 100 has the capability of separately monitoring and managing power usage, appliances, utilities and so forth across a number of individual tenants, as well as within the building premises as a whole. However, it will be appreciated that the present invention is equally applicable to smaller premises, having fewer tenants, such as an individual office, or domestic residence, as well as being applicable to larger premises and facilities, such as factories and the like.

The exemplary system 100 includes a microprocessor-based controller 102, the features of which are described in greater detail below with reference to FIG. 2. The controller 102 is interfaced to one or more metering units 104, which have the ability at least to provide time-dependent readings of energy consumption (ie such as time-of-use or interval meters), but which may also have more advanced features that are operable under the control of controller 102 (ie smart meters). Power is supplied 106, via the metering units 104, to the various tenancies within the premises. In particular, each tenant has a number of energy-consuming appliances 108, such as lighting, heating and/or cooling appliances, computers and peripherals, and so forth. The office building also typically includes shared systems and appliances, such as lighting, heating, cooling and so forth within common areas. In general, a premises may also include energy-generating appliances, such as roof-mounted solar panels. All such appliances, connected via the power supply system 106, are able to be monitored and managed within the system 100.

The controller 102 may also be connected to meters and/or control units associated with other utilities 110, such as water, gas and so forth. Additional interfaces for monitoring and/or controlling energy generation facilities or appliances, such as solar panels, wind generators and the like, may also be accessible to the controller 102. In general, these interfaces 110 provide the controller 102 with additional information relating to the operation of various utilities and other facilities, and possibly also with the capability of controlling those utilities and facilities.

Also interfaced to the controller 102 is a graphical user interface (GUI) device 112. The GUI may be, for example, a conventional PC or terminal interface, or a flat panel touch screen display. The latter may be particularly preferred in domestic and office environments, since a flat panel may be mounted on the wall, in order to provide a convenient means for an operator (eg tenant or other building occupant) to monitor and control energy consumption within the premises. A number of exemplary displays that may be provided via the GUI 112 are illustrated and discussed below with reference to FIGS. 5 to 10.

The controller 102 is also operably associated with a number of further communications interfaces 114. These may include interfaces to local networks, telephony networks (eg SMS), and/or the Internet. The communications interfaces 114 provide access via one or more corresponding communications networks 116 to a variety of remote devices 118. The remote devices 118 may be, for example cellular telephones, personal computers, PDAs, and so forth, which are operable by users at remote locations in order to interact with the controller 102. The remote devices 118 may enable users to access features corresponding with those of the GUI 112 while located off site. In addition, the controller 102 is able to send alerts and other messages to various types of remote device 118, and to receive commands sent by operators from the remote devices 118. For example the controller 102 may send an alert to a remote cellular telephone via SMS messaging, and receive commands, such as for the operation of individual appliances, back from an operator in the same manner. Such functions are described in greater detail below, particularly with reference to FIG. 4 and in examples 1 to 3.

Figure 2:
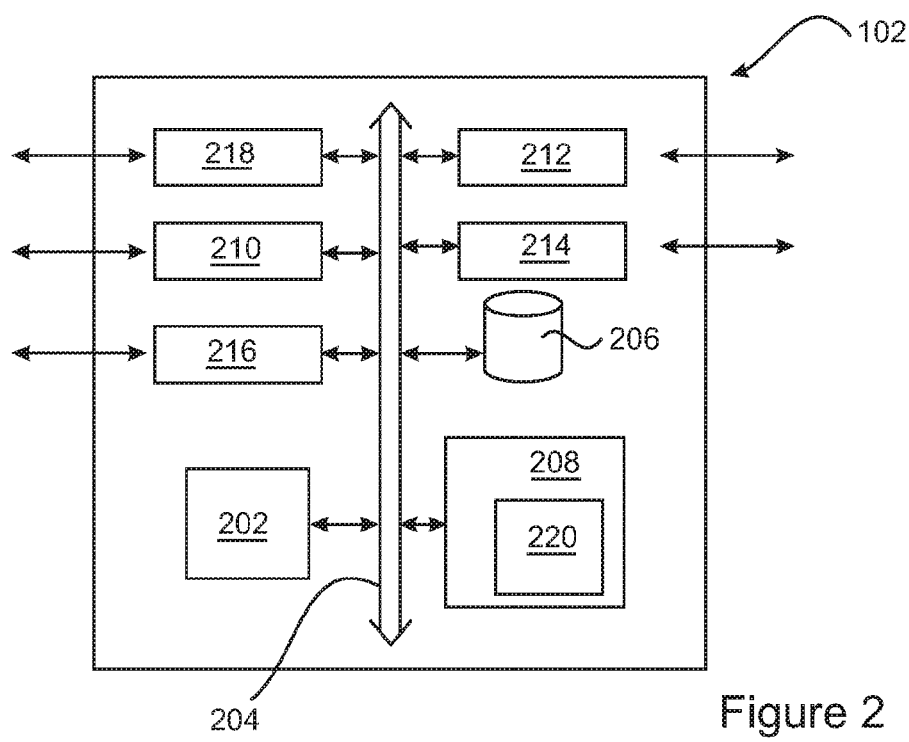
FIG. 2 is a block diagram of a controller for the system of FIG. 1.

Turning now to FIG. 2, there is shown a block diagram of a microprocessor-based controller 102. The controller 102 includes a microprocessor 202, which is interfaced to one or more internal communications and/or data buses 204. (For simplicity, only a single exemplary bus 204 is illustrated in FIG. 2, however it will be appreciated that in a conventional microcomputer architecture a number of different communications and data buses are employed, including the native microprocessor address and data bus, and peripheral buses such as PCI, IDE and so forth.)

The microprocessor 202 is interfaced with a high-capacity, non-volatile memory/storage device 206, such as one or more hard disk drives. The storage device 206 may be used to contain programs and data required for the operation of the controller 102, and for the implementation and operation of various software components implementing the functionality of the controller, according to the preferred embodiment. The storage device 206 may also be used for temporary and long term storage of data associated with the management of energy consumption within the premises. This may include profile data, predicted energy consumption data, and actual recorded energy consumption data, as will be described in greater detail below with reference to FIG. 3.

The controller 102 further includes one or more additional storage devices 208, typically being a suitable type of volatile memory, such as Random Access Memory, for containing program instructions and transient data relating to the operation of the controller 102.

The controller 102 further includes an interface 210 to a local area network, such as a wired network (eg Internet) and/or a wireless network (eg Wi-Fi).

User interface components 212 are also provided, for example keyboard and/or mouse inputs, graphics card and display outputs, and/or a touch screen interface, for connecting to the GUI device 112.

Other peripheral interfaces, such as a USB interface 214, are also optionally provided, and may be used, for example, to connect to various appliances 108 and/or other utilities 110. Of course, some appliances 108 and utilities 110 may themselves be connectable to a local area network, and thus accessible via the interface 210. Various other means may be provided for interfacing to different appliances 108 and/or utilities 110, such as a power line communications interface 216, and one or more dedicated custom interfaces 218. As will be appreciated, the specific manner in which the controller 102 is able to communicate with an appliance 108, or a utility 110, depends largely upon the configuration of the specific appliance or utility. The relevant interfacing methods are, however, readily within the grasp of persons skilled in the relevant art.

The memory device 208 contains a body of program instructions 220 embodying various software-implemented features of the present invention, as described in greater detail below with reference to the remaining drawings. In general, these features include monitoring, analysis, control, display, communications and associated functions for managing energy consumption associated with the premises, and for assisting human operators to manage energy consumption associated with the premises. Such functions may be implemented using conventional software development techniques, in accordance with the various algorithms and flowcharts described below.

Figure 3:
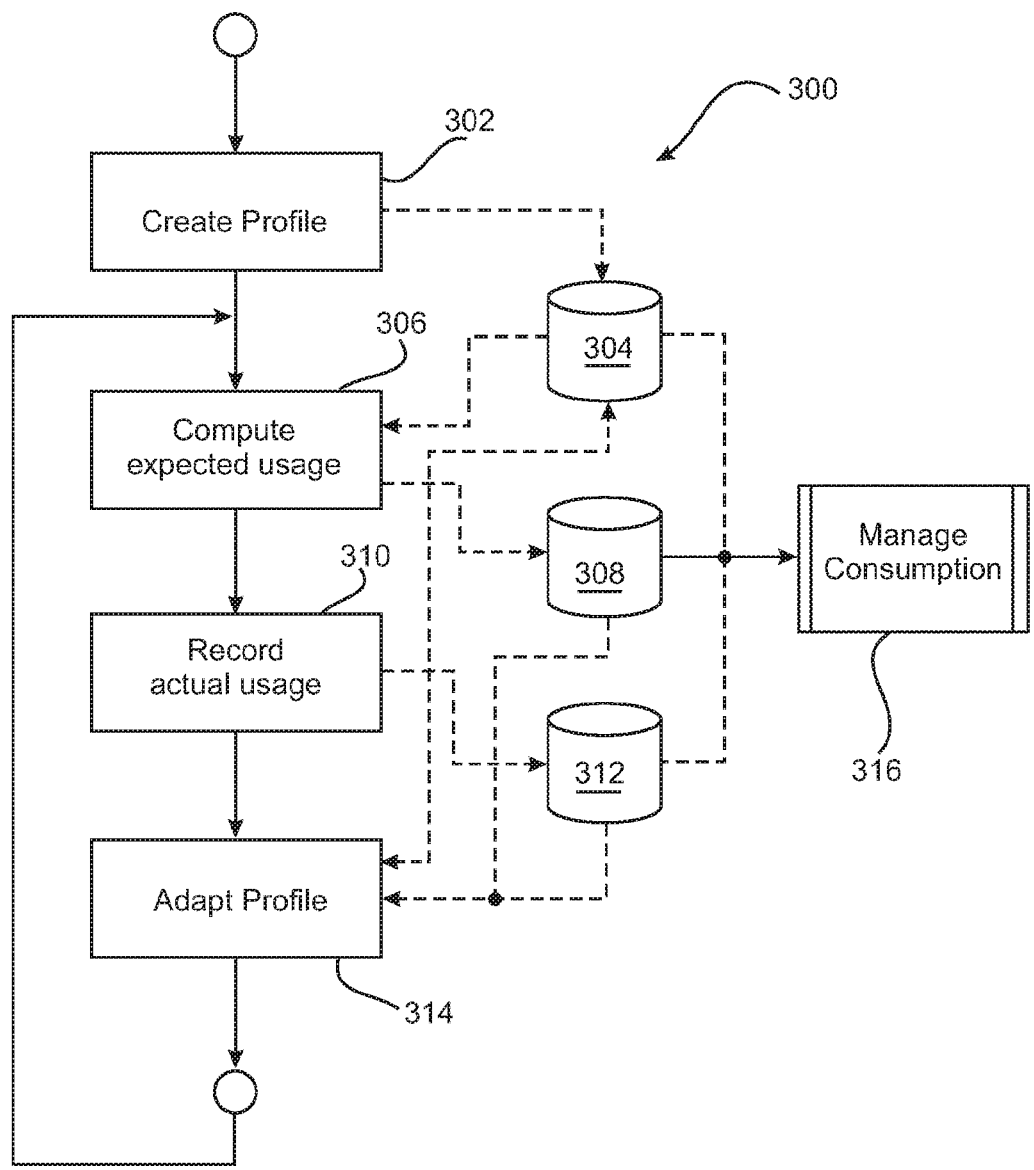
FIG. 3 is a flowchart illustrating a method of managing energy consumption associated with a premises according to an embodiment of the invention.

Turning now to FIG. 3, there is shown a flowchart 300 illustrating a method of managing energy consumption associated with a premises, according to the preferred embodiment. The method 300 will be described firstly in general terms, with further detail in relation to consumption management being subsequently discussed with reference to FIG. 4, interactions with an operator via the GUI 112, with reference to FIGS. 5 to 10, and the use and adaptation of energy "profiles" being described with reference to a number of examples.

In particular, the first step 302 of the method 300 is to create and store an initial energy profile of the premises, and/or of each tenant, room and/or other sub-units within the premises.

Typical contents of a profile are discussed in greater detail with reference to a number of examples below. However, for present purposes it should be understood that a profile is a data structure (or other collection of data), and relevant associated software elements, which is characteristic of the premises. For example, a profile may include characteristic information and/or parameters of the premises, including occupancy patterns (eg number of occupants according to time of day/week), size and layout of premises, usual function of premises (eg domestic residence, office, restaurant etc), geographical location of premises, climate for other meteorological information, and information about known appliances in operation at the premises. The profile may have associated algorithms and/or executable program code for managing energy usage, based upon the parameters of the profile, or the specific profile parameters may be utilised in conjunction with "generic" algorithms or executable software code deployed within the general operating programs of the controller 102. A key feature of the system 100 is its ability, through the use of a stored profile, to be aware of its operating context, ie the particular characteristics of the premises, in order to provide meaningful management and control information. It will be appreciated, for example, that the patterns of energy consumption are quite different for a domestic residence located in a cool climate, as opposed to a similar sized residence located in a tropical climate. Furthermore, the energy consumption patterns and characteristics of an office building are quite different to those of a domestic residence, or a restaurant. All of these different characteristics may be captured by the profile for the premises. As indicated in the flowchart 300, the profile for the premises is held within a profile store 304, which is located on the storage device 206.

At step 306, expected energy usage for a predetermined time period (eg a day, week and/or month) is computed. The expected usage data may be retained within a predicted usage store 308, for example on storage device 206. In some embodiments, however, it may not be necessary to maintain a separate predicted usage store 308, since predicted usage at any required time may in principle be recalculated based upon the stored profile 304, and other relevant information available to the controller 102. From the perspective of management of energy consumption, the prediction of expected energy usage is significant because it enables the controller 102 to identify deviations from anticipated consumption, which may then be used as the basis for generation of relevant warnings, alerts, and/or to apply controls to one or more appliances so as to reduce energy consumption.

At step 310, actual energy consumption is monitored and recorded, using information supplied to the controller 102 by the metering units 104. An actual consumption store 312 is used to retain the recorded usage information. The usage information 312 is preferably maintained in non-volatile storage 206, so that it is subsequently available for a variety of different purposes. For example, historical usage may be used for the purpose of adapting the profile 304. Maintaining the historical usage data also enables an operator to review actual energy consumption over past periods, for example for comparative purposes. For this reason, historical usage data 312 may be retained for a relatively long period of time, and even over many years.

At step 314, the controller 102 reviews the profile 304, the predicted energy consumption 308 and the actual energy consumption 312 over a relevant predetermined time period, and uses this information as required to adaptively update the profile 304. Provision for adaptive updates to the profile 304 is another key feature of the system 100. In particular, an initial profile generated at step 302 may be somewhat "generic", being based upon typical characteristics of premises of the type and location of the specific premises under management. However, every individual premises, even of the same general type and location, will have different energy usage characteristics. For example, even two identical domestic residences having the same number of occupants and located adjacent to one another will differ, because different people have different occupancy patterns (eg working hours), and different appliance usage patterns (eg some people may do more or less cooking, watch more or less television, or consider different temperature ranges to be comfortable, as compared with other people). The system 100 therefore eschews a "one-size-fits-all" approach, in favour of a context-aware approach, in which the system effectively "learns" the typical usage patterns of a premises by ongoing adaptation of the profile, ie at step 314.

It should be understood that profile adaptation 314 is, in principle, a continuously ongoing process, ie the method 300 subsequently repeats steps 306, 310, and 314 indefinitely. However, in practice the rate and extent of adaptation may change over time. For example, initially a relatively high adaptation rate may be employed, and/or the extent to which the parameters of the profile 304 may be modified, can be relatively large. This enables the process 300 to adapt a generic profile to reflect actual characteristics of the premises at a relatively rapid rate. However, following such an initial period, the rate and extent of adaptation may be reduced, so as to take into account possible changing usage patterns at the premises over time, without being unduly sensitive to individual extraordinary usage events.

Figure 4:
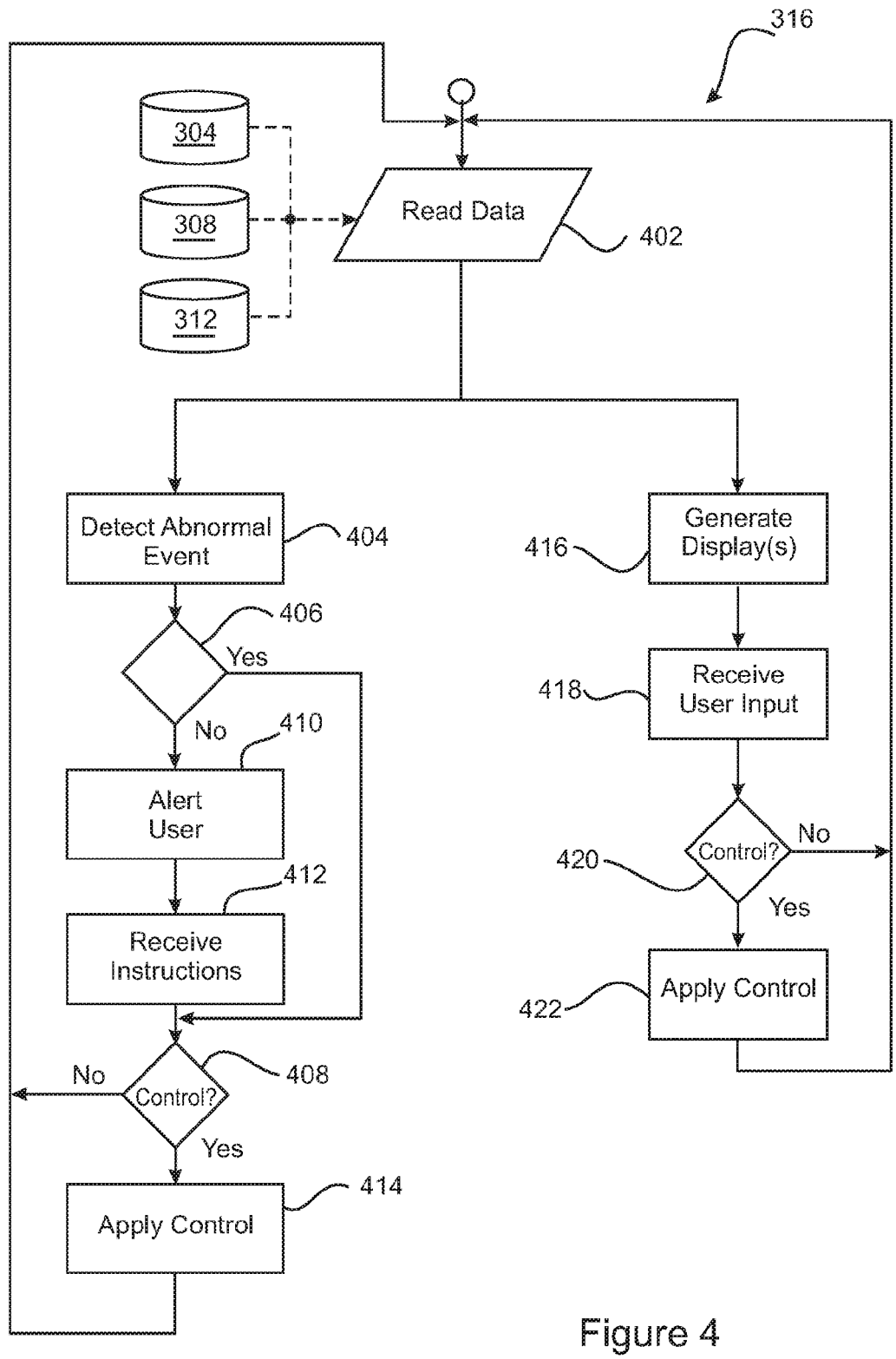
FIG. 4 is a flowchart illustrating in further detail a consumption management process within the method of FIG. 3.

In parallel with the process of adaptation, an ongoing consumption management process 316 is executed, also generally based upon the profile 304, predicted usage 308, and actual usage 312, and which is illustrated in greater detail in FIG. 4.

More particularly, FIG. 4 shows a flowchart illustrating a consumption management process 316 forming part of the overall energy consumption management method 300. Consumption management, which includes both automated functions performed by the controller 102, and partially or wholly manual functions initiated by one or more human operators, is based upon the input 402 of relevant information from the profile 304, predicted usage 308 and actual usage 312. As shown in FIG. 4, which will be understood as schematic and exemplary in nature, there are two parallel aspects to consumption management. One of these, consisting of steps 404 to 414, shown in FIG. 4, involves wholly and/or partly automated "event-based" management. The other, represented by steps 416 to 422, includes the analysis and display of information to a user, for example via GUI device 112, which facilitates monitoring of energy consumption of the premises, assists the user to gain a greater understanding of energy consumption patterns, and provides opportunities for the user to make decisions and behavioural changes which will result in reduced energy consumption.

Turning firstly to the event-based management, at step 404 this is initiated when an abnormal event is detected. An abnormal event may be any unusual or unexpected energy consumption, which is not consistent with historical usage patterns 312 and/or expected patterns 308 based upon the profile 304. The controller 102 may be programmed to identify and/or infer a specific cause for an abnormal event. For example, the controller 102 may be programmed and configured to detect that a particular appliance is switched on at a time when, according to the profile 304, the premises is not usually occupied and the appliance is not usually in use.

At step 406, the controller 102 determines whether an automated response is available for the particular abnormal event detected. For example, in the case of particular appliances the controller 102 may be programmed to automatically activate and/or deactivate the appliance in such circumstances. A decision in this regard is made at step 408. For example, the controller 102 may be programmed, in accordance with information stored in the profile 304, to automatically shut down an appliance, such as an air conditioner, when it is unexpectedly active at particular times of day, and/or in particular weather conditions.

Where an automated response is not available, the controller 102 may generate an alert to be delivered to one or more human operators, at step 410. For example, the controller 102 may be programmed to send an SMS message to one or more cellular telephone numbers advising of the abnormal event. The human operator is therefore alerted to the event, and may take appropriate corrective action, if warranted. Thus, at step 412 the controller 102 may receive an instruction, for example also via an SMS message, or via a web interface or similar, for control of a particular appliance. If a control instruction is provided, or if automated control was identified, then the decision step 408 directs flow to step 414, in which the controller 102 applies the required control to the relevant appliance.

With appropriate "training" of the system, ie when the profile 304 has been suitably adapted to typical usage patterns of the premises, the number of operator alerts 410 may be minimised, and such alerts will generally only occur when genuinely abnormal and/or unexpected events occur. The controller 102 may be programmed to repeat alerts at suitable time intervals, if no action is taken responsive to the abnormal event. In general, however, it is desirable that an excessive number of alerts is not generated, in order to avoid their becoming an irritant to the operator, who may therefore disable and/or ignore subsequent alerts. Through ongoing adaptation of the profile 304, the number of unnecessary alerts will be minimised, and the number of useful alerts maximised, such that users will find the system to be both persuasive (ie in encouraging action in response to alerts) and empowering (ie in providing greater and more convenient control over energy consumption).

In parallel, operators or users are provided with access to relevant information, and controls, via useful information displays, eg using the GUI 112, or from a PC or other device 118 which is able to access the controller facilities 102 via the Internet and/or other communications network. At step 416, the controller 102 is programmed to generate various information displays that may be of interest and/or utility to the operator. Some examples are described below with reference to FIGS. 5 to 10.

At step 418, the user interface also enables an operator to provide control input to the controller 102. For example, the operator may be enabled to turn particular appliances on and off, to change appliance settings, and to direct other operations of the controller 102. This facility may be used to reduce power consumption, by turning off unused appliances, or to activate appliances that may be required outside "normal" usage periods or patterns. For example, a user may wish to activate a heater and/or other appliances for the benefit of a person who is home due to illness on a weekday, and to avoid being provided with alerts relating to the abnormal use of such appliances. If the operator uses the graphical interface to issue control instructions, the decision step 420 directs flow to step 422, wherein the controller 102 applies the requested controls.

FIGS. 5 to 10 illustrate a number of exemplary display screens associated with steps 416 to 422 of the consumption management process 316. It should be noted that these displays are based upon data recorded during monitoring of energy consumption within the exemplary premises over an extended period of approximately one year. These data have been collected and used in the course of development of a prototype system, which has included the development of some initial exemplary profiles and algorithms. The general principles of the invention are not limited to these specific examples.

Figure 5:
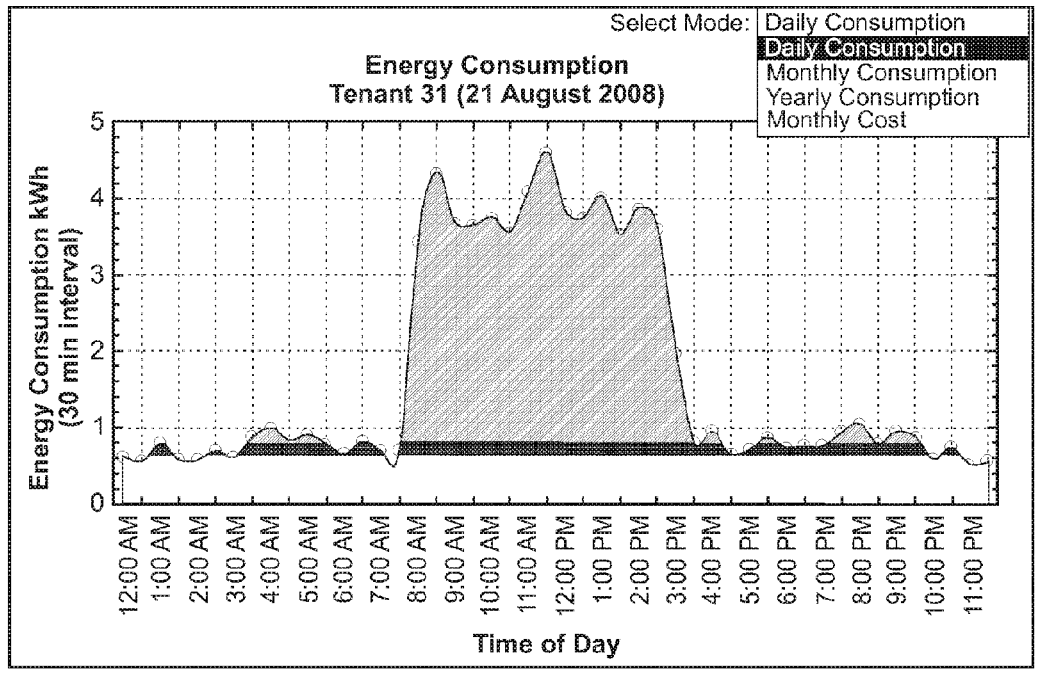
FIG. 5 shows a display of a daily energy consumption report according to an embodiment of the invention.

FIG. 5 shows a display of a daily energy consumption report for "Tenant 31" in the building. This particular tenant is a café. The daily energy consumption report clearly shows a period of high energy consumption commencing between 7:30 and 8:00 am and terminating between 3:00 and 3:30 pm. Highest consumption is associated with the early morning, and also late morning, continuing through the lunch period. This is consistent with the times during which other tenants in the building take their tea and/or lunch breaks. The times at which staff arrive and commence turning on the various café appliances, and at which those appliances are shut down and staff leave for the day, are plainly apparent in the relatively sharp increase of energy consumption in the morning, and decrease in the afternoon. Fairly constant overnight energy consumption reflects the reliance of the café upon refrigeration to preserve perishables.

It will be appreciated that daily energy consumption information, as shown in FIG. 5, not only enables the tenant to monitor its energy usage, and seek opportunities for savings, but also provides a basis for the development of a suitable profile for a premises housing a café or restaurant business.

Figure 6:
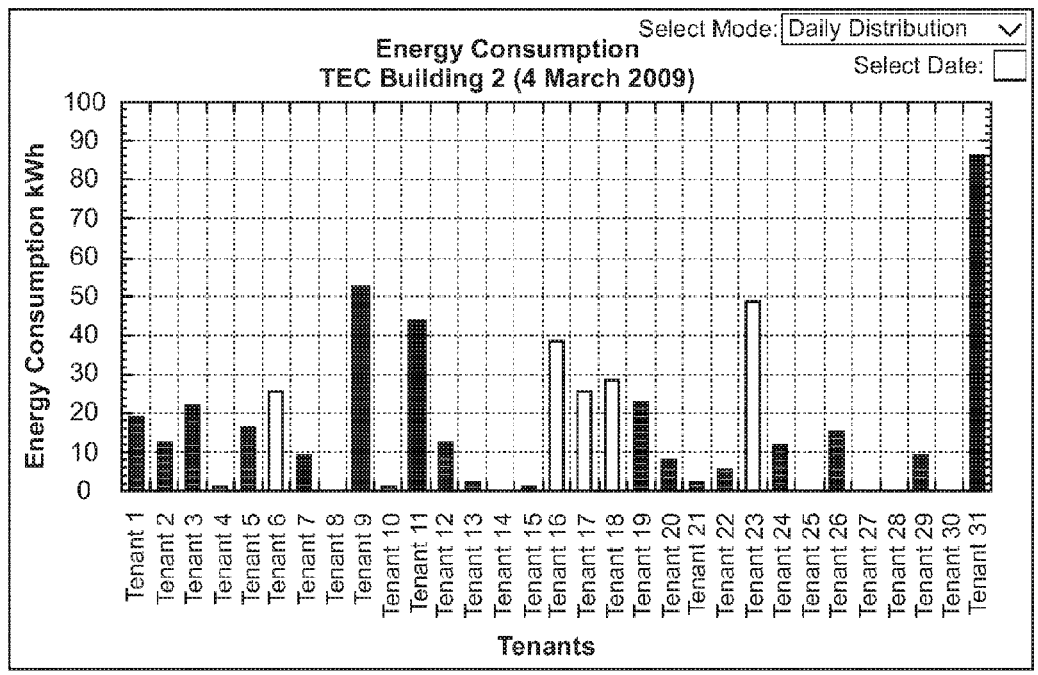
FIG. 6 shows a display of a building energy consumption report according to an embodiment of the invention.

FIG. 6 shows a further display of building energy consumption, by tenant, accumulated over a particular day. This enables the usage of each tenant to be reviewed and compared.

While not necessarily clearly visible in black and white images, in preferred embodiments the energy consumption displays are colour coded in order to indicate periods of low, medium and high energy consumption. For example, graduated colour coding may be used to fill the area under the daily energy consumption report graph shown in FIG. 5, while different colours may be used to indicate low-, medium- and high-energy consuming tenants in a display such as that shown in FIG. 6. Preferably the GUI enables an operator to "drill down" into daily consumption data for a particular tenant by selecting (ie via a mouse click, or touch of a touch screen) a particular bar in the bar chart as shown in FIG. 6, which causes the display of a chart such as that of FIG. 5.

Figure 7:
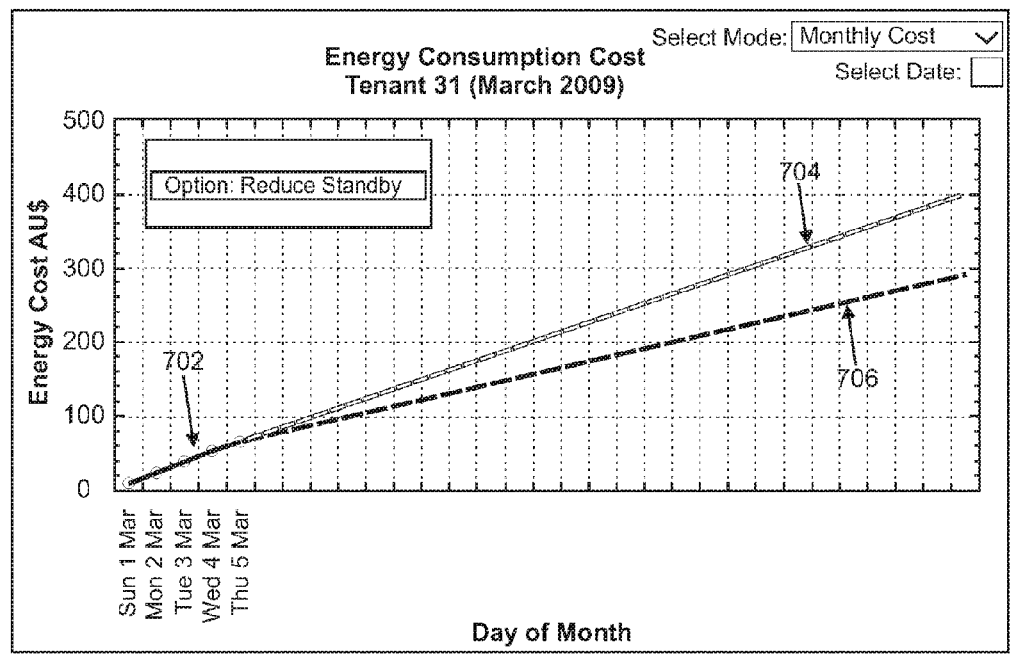
FIG. 7 shows a display of a monthly consumption cost and projection according to an embodiment of the invention.

FIG. 7 shows a display of monthly energy consumption cost, including projections of expected costs and potentially reduced costs. In particular, a first portion 702 of the graph shows actual usage for the first few days of the month. A first projection 704 shows the expected usage based upon actual historical behaviour. A second projection 706 illustrates potential savings that may be achieved if realistic reductions in standby power consumption are made. Examples 2 and 3 below provide further details of the manner in which the projections 704, 706 may be made based upon suitable profiles and analysis.

Figure 8A:
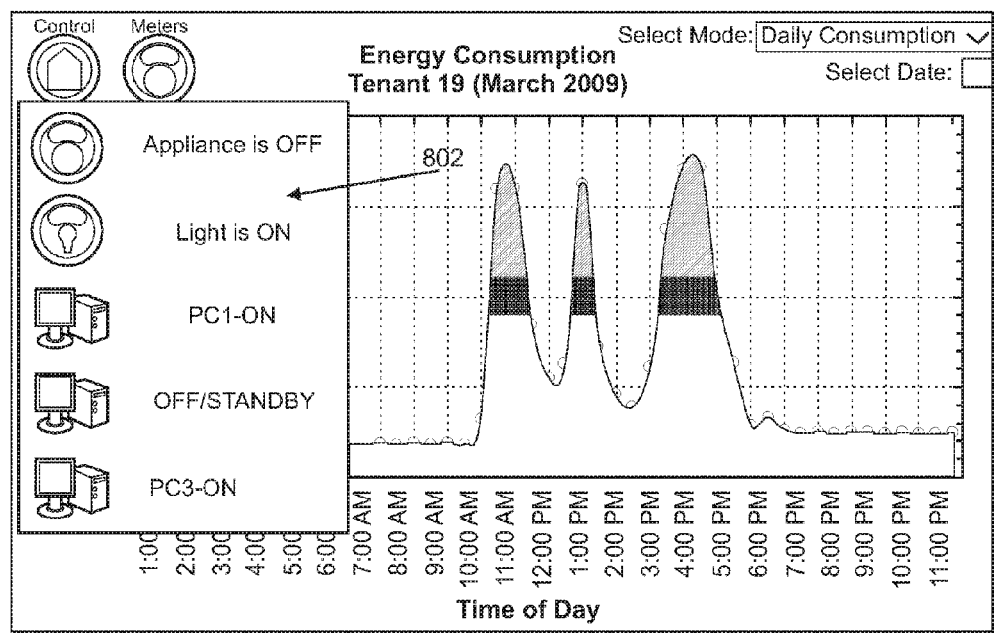
FIGS. 8(a) and (b) show displays illustrating on-site device and other utility control according to an embodiment of the invention.
Figure 8B:
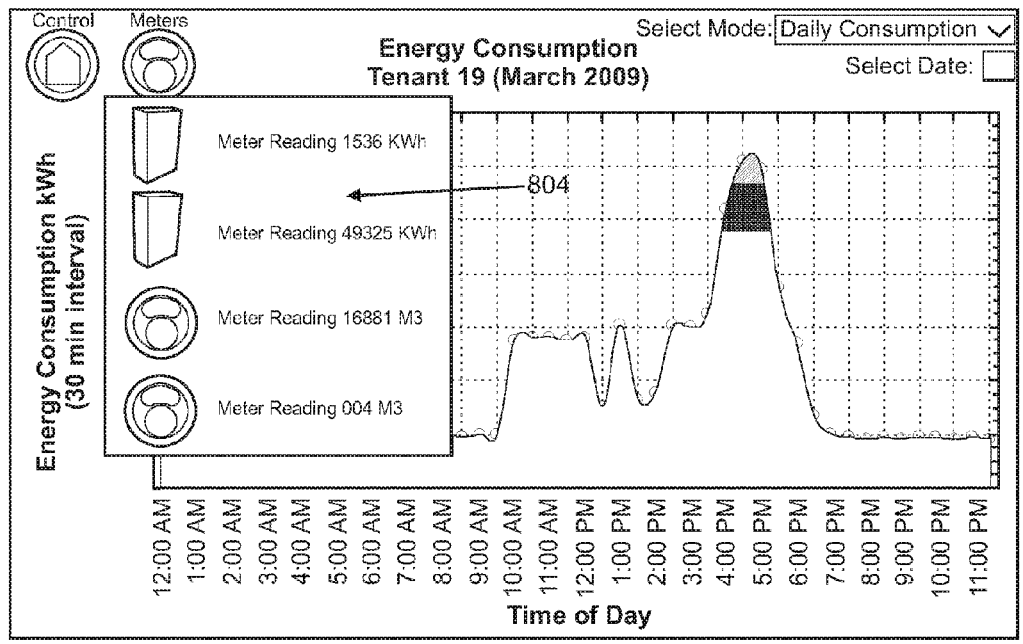

FIGS. 8(a) and 8(b) show exemplary displays illustrating on-site device and other utility control provided in the phototype system. More particularly, FIG. 8(a) shows a device control pane 802 for a particular tenant ("Tenant 19") within the building. A number of energy-consuming devices and appliances operated by the tenant have been adapted to be controllable via the controller 102. The display 802 shows the current status of each device, and enables the operator to select a device and change its status, for example by switching it on or off. As has previously been mentioned, various mechanisms may be used for control of devices and appliances, including power line communications, local area network communications, and other available control interfaces implemented between the appliances 108 and the controller 102.

FIG. 8(b) shows a real-time consumption measurement pane 804, which enables the operator to view various current meter readings. In combination with the device control pane 802, it is thereby possible for an operator to control various devices and appliances, and to observe the effects on power consumption in real time, or close to real time.

Figure 9A:
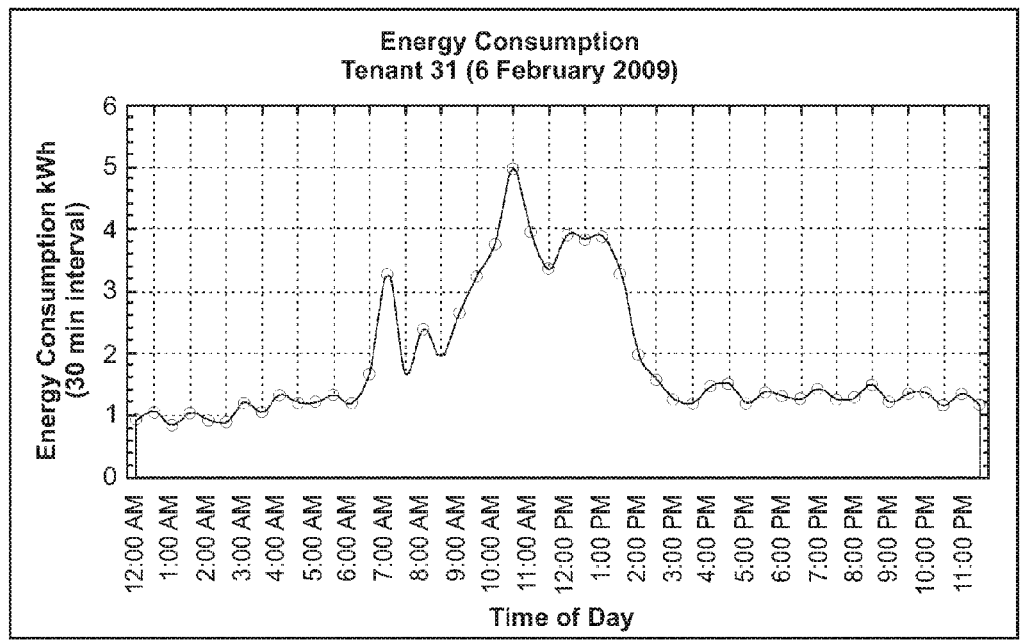
FIGS. 9(a) and (b) show displays of daily energy consumption reports on exemplary summer and winter days respectively, according to an embodiment of the invention.
Figure 9B:
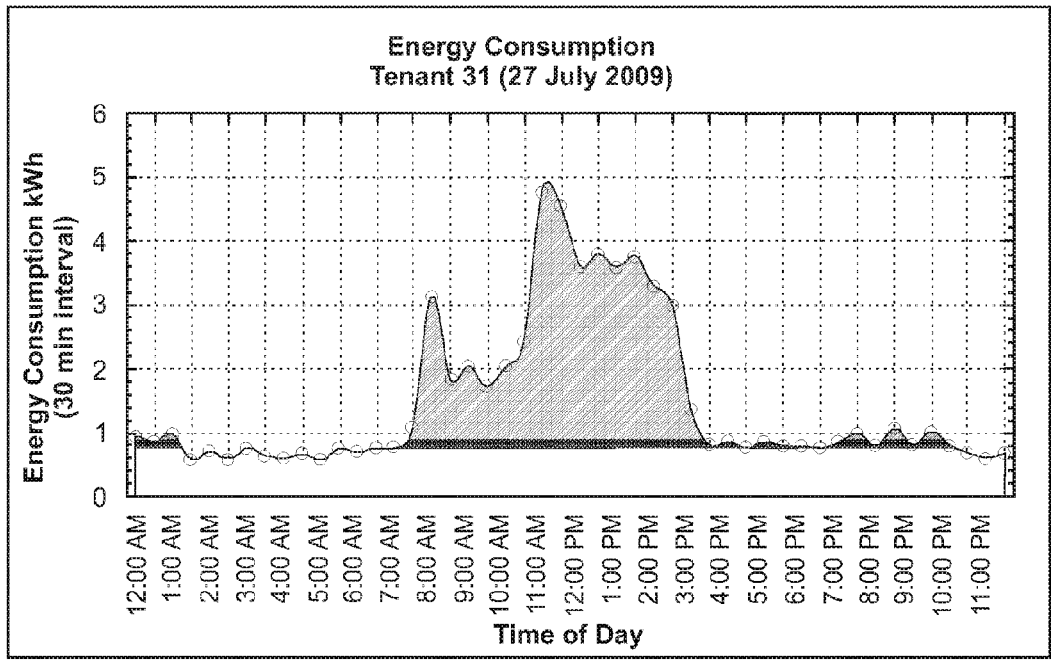

FIGS. 9(a) and 9(b) show comparative displays of daily energy consumption on exemplary summer and winter days respectively. Once again, these displays correspond with the café ("Tenant 31"). Once again, such displays enable human operators to monitor and compare energy consumption over time, which may assist in finding opportunities for achieving consumption savings. Additionally, these particular charts illustrate the importance of taking climatic effects into account within energy profiles for particular premises. The pattern and level of consumption of the café during summer is notably different from that during winter. In particular, the "base" level of energy consumption, corresponding with the overnight levels, is higher in summer due to the refrigeration load during warmer weather. This can be taken into account if the location of the premises is included within the profile, thereby enabling the controller 102 to obtain relevant climate information, weather forecast information, and real-time weather updates, for example from a relevant meteorological bureau or equivalent. In some embodiments, the controller 102 may also be interfaced to instruments located at the premises, both interior and exterior, measuring relevant information such as temperature and humidity.

It will be noted that there is an apparent one-hour shift between the main periods of energy consumption shown in FIGS. 9(a) and 9(b), ie approximately 6:00 am to 2:00 pm during summer compared with 7:00 am to 3:00 pm during winter. This shift is not "real", but rather reflects the fact that all charts herein are based upon standard time at the location of the trial premises and do not include an adjustment for summer time (ie "daylight savings" time) during the relevant periods. Of course, embodiments of the invention are readily able to account for summer time, by including a suitable adjustment to the times displayed in charts and other information, if so desired.

Figure 10:
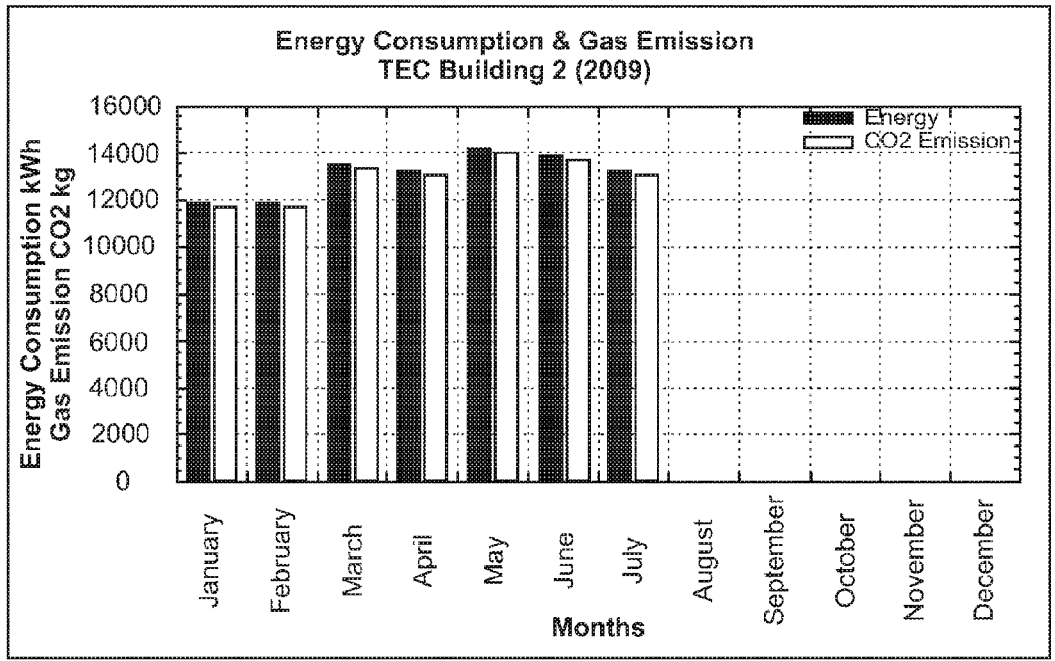
FIG. 10 shows a display of a monthly comparison report according to an embodiment of the invention.

FIG. 10 shows an exemplary display of a monthly comparison report for the building. This report shows total energy consumption, as well as total $CO_2$ emissions for the building, on a monthly basis. While the chart in FIG. 10 shows only the totals, in some embodiments the controller 102 may have access to sufficient information to break this information down further, for example to show heating and cooling loads separately from other consumption. This kind of information is also useful, over time, to assist tenants and building managers, to identify and adopt behavioural practices that may result in reduced energy consumption.

Further explanation of the content and use of energy profiles, and associated algorithms, will now be provided by way of examples.

Example 1

Heating/Cooling

In this example, the contents and use of a profile for a domestic residence will be discussed, in relation to the management of heating and cooling facilities.

Information required in the initial profile for the domestic residence may include:
relevant sizes of the residence and/or individual rooms;
information relating to the type and characteristics of heating and cooling appliances located at the residence;
location information of the residence, which may be linked to climate information (either pre-loaded or downloaded via the Internet), and which may be regularly updated using local forecast and observation data; and
typical resident home and away times (on a daily and weekly basis, bearing in mind that weekdays and weekends will normally have different parameters).

Optionally, though not essentially, the controller for the domestic residence may have access to a sensor and/or thermostat providing internal temperature data in real time.

Predictions of energy consumption associated with heating and cooling may then be computed. In particular, energy consumption can be derived from the size of the residence, or particular rooms, which are to be heated or cooled, in combination with known target temperatures, local climate data and weather forecasts/observations, and the expected times of usage based upon resident occupancy.

Actual usage may then be monitored over a predetermined period, for example on a day by day basis.

Profile adaptation may then be performed as follows. Typical weekday and weekend occupancy patterns may be preset in an initial "generic" profile, assuming away times between 8:00 am and 6:00 pm weekdays, and permanent occupancy over the weekend. The profile may also distinguish between "awake" and "sleep" times, assuming that highest energy consumption will occur during periods when the residence is occupied, and the residents are awake. Actual patterns of heating/cooling energy consumption may differ from those predicted, and the corresponding times in the profile may be adapted accordingly. Preferably, on initial installation, the values are adapted more rapidly and/or in larger increments, however after a few weeks of tuning the values may be altered in smaller degrees.

After a sufficient period of adaptation, which may be determined by a reduction in variability between predicted and actual usage, any changes in apparent usage pattern may be used as the basis for consumption management measures, such as providing the user with appropriate alert messages, as described above with reference to FIG. 4. The user can also provide the system with information either temporarily or permanently overriding or modifying the parameters presently held in the profile. For example, the user can advise the system, eg via the GUI, if they are going to be absent for a particular period, or if they wish to prevent further adaptation of a particular pattern after a period of adaptation.

The system may also be configured to provide the user with suggestions for improving energy efficiency, and/or introduce automated controls to implement such strategies, such as the following:
based upon offline/online climate data, an optimum set temperature may be computed, eg the user may be advised that by setting an internal temperature only one or two degrees higher during summer substantial energy savings may be available;
apparent temperatures can be calculated using humidity data, in order to optimise heating and/or cooling for specific conditions on particular days;
the system may implement pre-heating and/or pre-cooling based upon typical return times, thereby eliminating the need to run full ballast heating/cooling functions upon the resident's return;

the system may recommend strategies such as closing or opening blinds and curtains during periods of absence in summer or winter, and reinforce the value of such strategies by providing estimates of predicted energy savings; and the system may be configured to adaptively set target temperatures within the residence to an acceptable compromise between energy efficiency and desired temperature, within a predetermined range, depending upon whether significant savings may be achieved by allowing appropriately small variations from a desired set temperature.

Example 2

Household Appliances

In this example, the potential savings achieved by reducing standby power are considered.

An initial profile may include (eg in addition to other information associated with heating and cooling, and other aspects of energy consumption) the following:

size of rooms and/or house, and the number and relevant demographic details of the occupants (which may be indicative of likely usage of different types of appliance);

a list of typical devices/appliances that may be present and in use within the residence, along with known and/or inferred characteristics of such devices; and typical resident's home and away times (different for weekdays and weekends).

Predicted energy consumption is performed in a similar manner to the heating/cooling in Example 1 above, ie based upon resident occupancy times, and the relevant characteristics of the various devices and appliances associated with the residence.

It should be noted, however, that not all of the desired information noted above may be available, or it may be incomplete, and thus the adaptation of the profile may involve making improvements to the estimates of the size of the residence, number and types of devices, and so forth.

For example, adaptation of the profile may include improving estimates of the size of the residence based upon measured heating and cooling information. Home and away times may be estimated based upon times of increase/decrease in total energy consumption. A number of parameters, which may be stored in the profile, may be used to control the operation and accuracy of this mechanism. For example, the profile may include a threshold indicating the amount of a "step" increase or decrease in consumption that will be taken to indicate departures and arrivals of residents. Furthermore, a parameter specifying a minimum period of increased/decreased consumption may be included, which determines how long an increase or decrease must persist before it is taken to correspond with arrival or departure of residents.

The identification and prediction of use of various devices and appliances may be based upon specific characteristics. For example, a refrigerator is characterised by sustained consumption overnight, which will be seasonally dependent (ie higher during warmer weather, and lower during cooler weather). The level of such consumption may be used to estimate the size of refrigerator. Different types of heating and cooling systems also have characteristic consumption levels, correlated with the time taken to regulate the temperature of the residence to a desired value. Microwave ovens exhibit sudden high consumption patterns, having a short duration, during occupancy times. Other information that may be available from a smart meter, such as power factor, may also be useful in identifying the presence of particular appliances.

For many appliances, such as televisions, standby power consumption can be eliminated completely since the appliance need not be left in standby mode when not in use. For other appliances such as refrigerators, a level of "standby" power consumption is unavoidable. Security systems also cannot be completely deactivated, particularly during periods when residents are absent.

However, various consumption management actions may be identified and implemented. For example, it may be possible to identify an appliance that has been left on, such as an iron, television, or other device that is only required when residents are actually present. The user can be alerted of such events on a case by case basis, and/or may be alerted if the system identifies certain appliances that are being consistently left on when not in use. The user may be enabled to remotely deactivate such appliances, for example from a cellular telephone, PDA, remote PC, or other device. The GUI 112 may also provide a facility for one-touch cut-off of standby consumption of appropriate appliances, such as televisions and entertainment systems eg when leaving home or when retiring in the evening. By estimating the level of unnecessary standby consumption, ie all measured consumption other than "essential" use (eg refrigerators, security systems and the like), the GUI may display predicted savings, for example in the form illustrated in FIG. 7.

Example 3

Office Occupancy

This example relates to the management of power consumption in an office environment.

In this example, an initial profile is based upon a typical expected occupancy time (expected change-of-state time frame) between 8:30 am to 5:30 pm.

For adaptation on the profile, changes (ie gradients or slopes in the actual usage data) within the corresponding surrounding periods of 7:30 am to 9:30 am, and 4:30 pm to 6:30 pm are analysed in detail or given more weight. Advantageously, analysis frequency/resolution at other times may be reduced thereby reducing the computational load. (It is noted that a similar analysis approach may be adopted for domestic residences, taking into account the different occupancy times as discussed in Examples 1 and 2.)

In accordance with preferred parameters of the profile, the average standby consumption (AvStandby) is computed over the period between 12.00 am and 4.00 am. Preferably this is computed for each tenant, and also for the whole building.

An estimated occupancy arrival time (in the morning) is determined as a time at which consumption exceeds 150% of AvStandby for the entire building. For example, the average half-hour standby usage is about 5 kWh for the entire building at the trial site, and historical data shows that on more than 95% of weekdays, when consumption reaches 1.5 times average power the building can be assumed to be occupied.

It has been found through analysis/review of historical consumption patterns that the occupancy departure time (in the evening) is irregular. This is because the time at which people leave for the day is irregular in comparison to their arrival time in the morning. In accordance with the preferred profile parameters, an estimated departure time is calculated as the time at which consumption for the building is within 25% to 35% of the average standby consumption within the expected time frame (4:30 pm to 6:30 pm).

The computation for the building is also used as a reference for individual tenants.

Based upon historical observations, it has been found that a different calculation is more appropriate for individual tenants. For most tenant suites only a 10% to 15% increase/decrease for two consecutive readings indicates change in the occupied/vacant state. There are, however, exceptions to this "rule", generally identifiable by relatively large variations (eg 10% or more) in standby consumption which can "mask" the true arrival/departure times. In one such case, for example, a suite houses a number of servers. In such cases, a larger change in consumption must be observed before concluding that the suite is occupied/vacant. For example, the "whole building" parameters may be applied, ie when consumption reaches within 25% to 35% of AvStandby for the tenant within the relevant morning/afternoon time frames, the tenant's suite can be assumed as occupied/vacant.

These values are initially preset and later refined through the adaptation process. During the first three weeks following installation a weight factor of 80%, 70% and 60%, respectively, is applied to quickly tune the system. Subsequently, an alert will be generated and/or further adaptation performed if a variance of more than 10% (based on two half hour readings) is observed consistently for more than one week. Additionally, any single change in the arrival/departure times will be limited to a maximum of a half-hour after the first three weeks.

Once the profile has been adapted to reflect actual occupancy periods, potential standby savings may be computed in the following manner.

Standby consumption, in principle, is consumption during all unoccupied times. However, in a preferred profile a buffer parameter, eg 25%, is used to exclude the periods immediately prior to estimated morning arrival, and immediately following estimated evening departure, in order to reduce error due to day-to-day variations in activity. For example, standby consumption may be calculated as power consumed from 7:00 pm to 7:00 am, instead of 5:30 pm to 7:30 am. For the whole building, standby consumption may be computed as the average of the values of all individual tenants, multiplied by to the total time.

In the preferred profile the estimated saving is then computed as 80% of the total standby consumed to offer a more realistic estimate, since not all standby consumption can be eliminated. This reduction factor is also a variable parameter of a profile and, by way of further example, observations of actual consumption reduction indicate that a higher value is appropriate for profiles associated with domestic residences, since a greater proportion of standby power may be eliminated in such premises.

Colour coding for graphical displays of data (eg red for "High", yellow for "Medium" and green for "Low") may be computed in the following manner.

Analysis of historical consumption data, taking into account average area and comparison of the consumption of various tenants, enables the setting of initial profile values for colour coding, which may then be adapted based upon larger sized suites and usage trends over time. These initial values are thresholds for half-hour readings for each tenant, eg below 0.5 kWh is green, between 0.5 and 0.9 kWh is orange and over 1 kWh is red.

These values are then used to generate threshold values based on the number of readings actually available at the time of generation of a display. For example, when generating a chart at 9:00 am for one tenant 18 half-hour readings will be available for the day, nominally 15 in standard standby hours and three in usage hours, and a corresponding threshold is computed as 0.8×15+3×threshold. The purpose of the multiplier 0.8 (ie 20% reduction for standby hours) eliminates an immediate "red" or "orange" display. It will be appreciated that the standby hours in this example are based upon the initial profile. Following adaptation, actual standby times for the tenant suite are used.

Estimation of monthly consumption and potential for reduction (as illustrated in FIG. 7, for example) may be computed in the following manner.

Typical monthly consumption is estimated as multiple of average daily consumption for a particular tenant in that month multiplied by number of days remaining. The average value is computed using data for past days, for which complete data is available to ensure accuracy. If the number of past days in the month is less than seven days, or the ratio of weekdays and weekend days so far in the month not representative of actual longer-term usage (ie much different from 2:5) then the average consumption from a previous month may be used to balance the data, eg estimated average daily usage may be computed as 0.6×previous month average plus 0.4×current month average to date.

Standby savings are then assumed as described above, and the various projections generated and displayed.

The cost/emissions associated with consumption (eg as shown in FIG. 10) may be computed using appropriate parameters relating usage (in kWh) to price and emissions. Suitable parameters may be obtained from suppliers, and from emissions studies such as that available at http://www.sedo.energy.wa.gov.au/pages/emissions.asp.

For example, in the trial building, conversion ratio of 1 kWh consumption to kg of carbon dioxide (main greenhouse gas) is {Grid=0.992, NaturalGas=0.219; LPG=0.242, Wood=0.329), and costs are based on the supplier's standard SME rate of 17.5 cents/kWh. It will be appreciated that where variable tariffs are applied, based upon time-of-day and/or a "real-time" energy market, this can be taken into account in the calculation of costs.

Prospective reductions by modification of heating/cooling can also be estimated and suggested to users. For example, heating and cooling accounts for approximately 40% to 60% of consumption in office complexes. Typical settings are in the range of 22 to 24 degrees Celsius. It is known, however, that allowing adjustments of set temperature between 20 and 25 degrees Celsius. can offer consumption saving of about 25%. This will translate, conservatively, to about 10% reduction in total consumption. Presenting these potential savings graphically to users is a powerful tool for behavioural change.

CONCLUSION

A system and method of managing energy consumption associated with a particular premises has been described. In particular, this is based upon the use of an energy profile of the premises, which is adaptively updated in accordance with actual usage and other factors (eg user input), such that the system is "context aware", and automatically customisable to the particular characteristics of the premises. The system also provides a graphical user interface, which enables users to review actual energy consumption data, along with predictions and prospective saving strategies calculated and suggested by the system. The system is also able to provide users with real-time alerts in relation to unexpected or abnormal energy consumption events, and allows users to issue commands remotely for the controlling of appliances and other energy-consuming or -generating devices. The system therefore provides timely and persuasive prompts that enable effective action to reduce energy consumption in the short term, as well as facilitating long-term behavioural change. The system empowers users to take greater control and responsibility for their energy consumption.

While the foregoing description has covered various exemplary features of a preferred embodiment of the invention, it will be appreciated that this is not intended to be exhaustive of all possible functions and features provided within various embodiments of the invention. It will therefore be understood that many variations are possible, including combination of the various features and functions described in the examples, and that the scope of the invention is as defined in the claims appended hereto.

The invention claimed is:

1. A method of managing energy consumption associated with a premises, including the steps of:
   generating and storing an initial energy profile of the premises, the profile including information inferred by physical characterizing the premises;
   computing an expected energy usage associated with the premises over a predetermined time period based upon the information in the initial energy profile;
   recording actual energy usage associated with the premises over the predetermined time period;
   adaptively updating the initial energy profile based upon comparison of the recorded energy usage, the expected energy usage and the inferred characterizing of the premises; and
   using the adaptively updated energy profile and the actual energy usage to manage energy consumption associated with the premises.

2. The method of claim 1 wherein information in the energy profile includes a variety of characteristic information relating to the geographic location of the premises, the size, content and nature of use of the premises, and typical times of use of the premises.

3. The method of claim 1 wherein the profile includes information relating to the function of the premises.

4. The method of claim 3, wherein the information relating to function is used to infer typical characteristics of energy consumption associated with the premises.

5. The method of claim 1 wherein the profile includes information relating to associated appliances, including one or more of the number, type and characteristics of energy appliances installed at the premises.

6. The method of claim 1 wherein information relating to appliances associated with the premises is inferred based upon information in the profile along with actual energy usage, and adaptively incorporated into the energy profile.

7. The method of claim 1 which further includes performing real-time monitoring of internal and/or external temperatures of the premises to enable the setting and/or efficiency of heating and cooling appliances within the premises to be evaluated, thereby providing opportunities to manage ongoing energy consumption associated with such appliances by adjustment to operational settings, including times of operation and/or set temperatures.

8. The method of claim 1 wherein the steps of recording actual energy usage, and adaptively updating the energy profile, are repeated over one or more subsequent time periods.

9. The method of claim 8 wherein the rate and/or magnitude of updates are reduced over time as compared with the initial update cycle.

10. The method of claim 1 wherein managing energy consumption includes detecting abnormal events, and generating corresponding alerts.

11. The method of claim 1 wherein managing energy consumption includes activating and deactivating appliances.

12. The method of claim 11 wherein a step of activating or deactivating an appliance includes requesting confirmation by a human operator, and may further include the manual and/or automated operation of the appliance via a remote interface.

13. The method of claim 1 wherein managing energy consumption includes identifying and/or predicting potential energy-saving strategies, including a reduction in standby power consumption.

14. The method of claim 1 which includes alerting a human operator in the event that one or more appliances may have inadvertently been left on.

15. The method of claim 1 wherein the step of managing energy consumption includes:
   sending to an operator information regarding energy consumption and/or alerts relating to abnormal events via email, SMS messaging, messages transmitted to a specific remote software application, and/or other means;
   receiving from the operator an instruction for operation of one or more appliances associated with the premises via email, SMS messaging, messages transmitted using a specific remote software application, or other means; and
   controlling said one or more appliances in accordance with the operator instructions.

16. A system for managing energy consumption associated with premises, the system including:
   a metering unit which is configured to provide time-dependent readings of energy usage associated with the premises; and
   a microprocessor-based controller including an interface for communicating with the metering unit, and having a data store containing information representing an initial energy profile of the premises, wherein the initial expected energy profile includes information inferred by physical characterizing the premises,
   wherein the controller is configured to:
      compute an expected energy usage associated with the premises over a predetermined time period based upon the information in the energy profile;
      receive from the metering units, and record in the data store, actual energy usage associated with the premises over the predetermined time period;
      adaptively update the information representing the initial energy profile of the premises, based upon comparison of the recorded energy usage, the expected energy usage and the inferred characterizing of the premises; and
      use the adaptively updated information representing the energy profile of the premises, and the actual recorded energy usage, to manage energy consumption associated with the premises.

17. The system of claim 16, further including user interface apparatus having a graphical display and appropriate control inputs enabling an operator to review information representative of energy consumption associated with the premises, and to direct operation of the controller and/or appliances installed at the premises.

18. The system of claim 16, further including additional communications interfaces, including one or more of an SMS or other messaging interface, to enable the delivery of real-time alerts, warnings or updates to a human operator.

19. The system of claim 16, including appliances associated with the premises which are operable by the controller via one or more appliance communications systems.

20. A computer-implemented apparatus for managing energy consumption associated with premises, the apparatus including:
- a microprocessor;
- at least one memory device, operatively coupled to the microprocessor;
- at least one input/output peripheral interface, operatively coupled to the microprocessor and configured to communicate with a metering unit which provides time-dependent reading of energy usage associated with the premises,
- wherein the at least one memory device includes a data store containing information representing an initial energy profile of the premises, wherein the initial energy profile includes information inferred by physical characterizing the premises, and
- wherein the at least one memory device further contains executable instruction code which, when executed by the microprocessor, implements a method including the steps of:
  - computing an expected energy usage associated with the premises over a predetermined time period based upon the information representing the initial energy profile of the premises;
  - receiving from the metering unit, and recording in the data store, actual energy usage associated with the premises over the predetermined time period;
  - adaptively updating the information representing the energy profile of the premises based upon comparison of the recorded energy usage, the energy usage and the inferred characterizing of the premises; and
  - using the adaptively updated information representing the energy profile of the premises, and the actual record associated with the premises, to manage energy consumption associated with the premises.

* * * * *